April 26, 1966  C. R. CUMMINGS  3,248,306
WATER PURIFICATION CONVECTIVE DISTILLATION APPARATUS
Filed Aug. 28, 1962  2 Sheets-Sheet 1
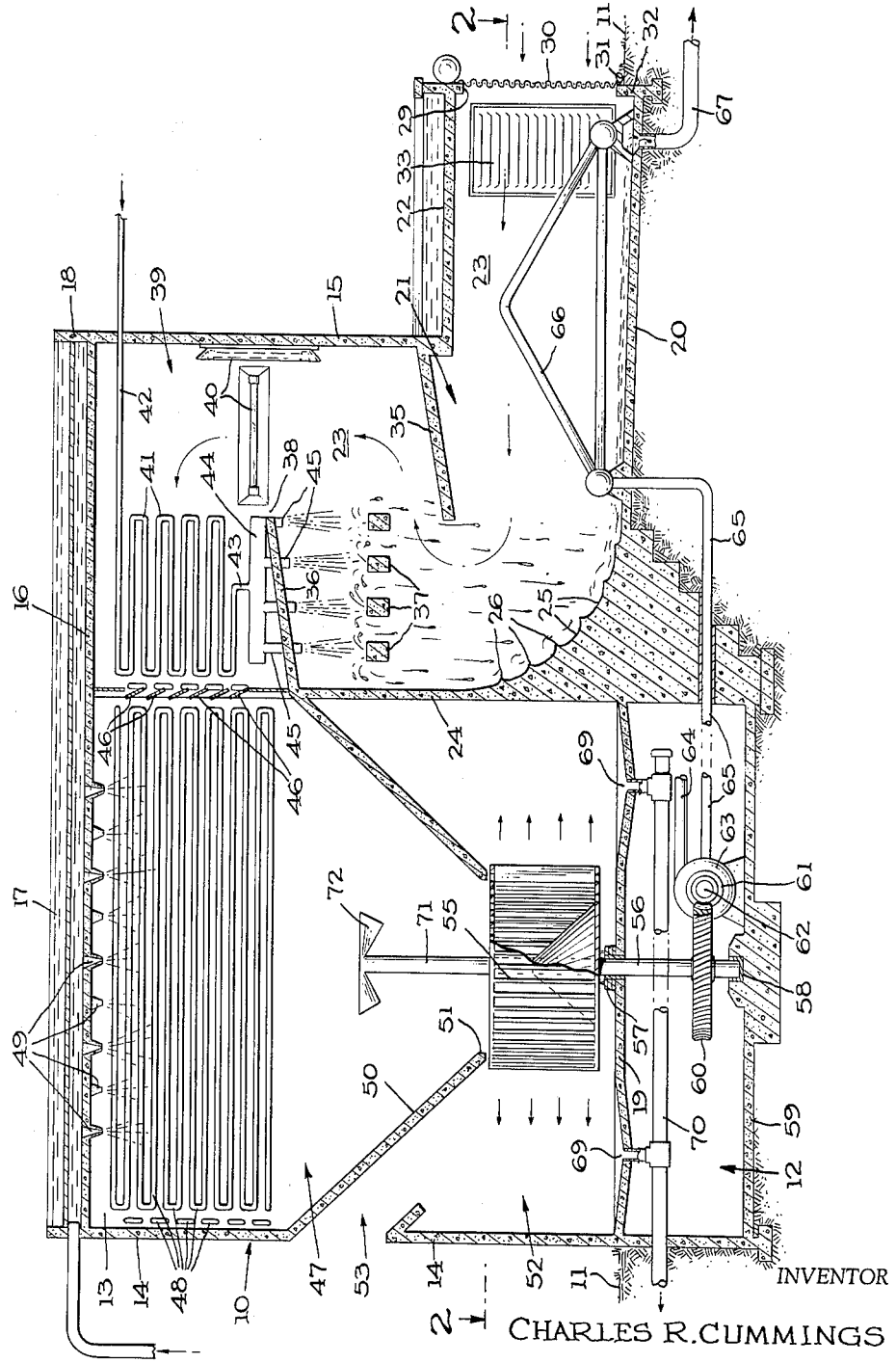
INVENTOR
CHARLES R. CUMMINGS
BY
ATTORNEY April 26, 1966 C. R. CUMMINGS 3,248,306
WATER PURIFICATION CONVECTIVE DISTILLATION APPARATUS
Filed Aug. 28, 1962 2 Sheets-Sheet 2
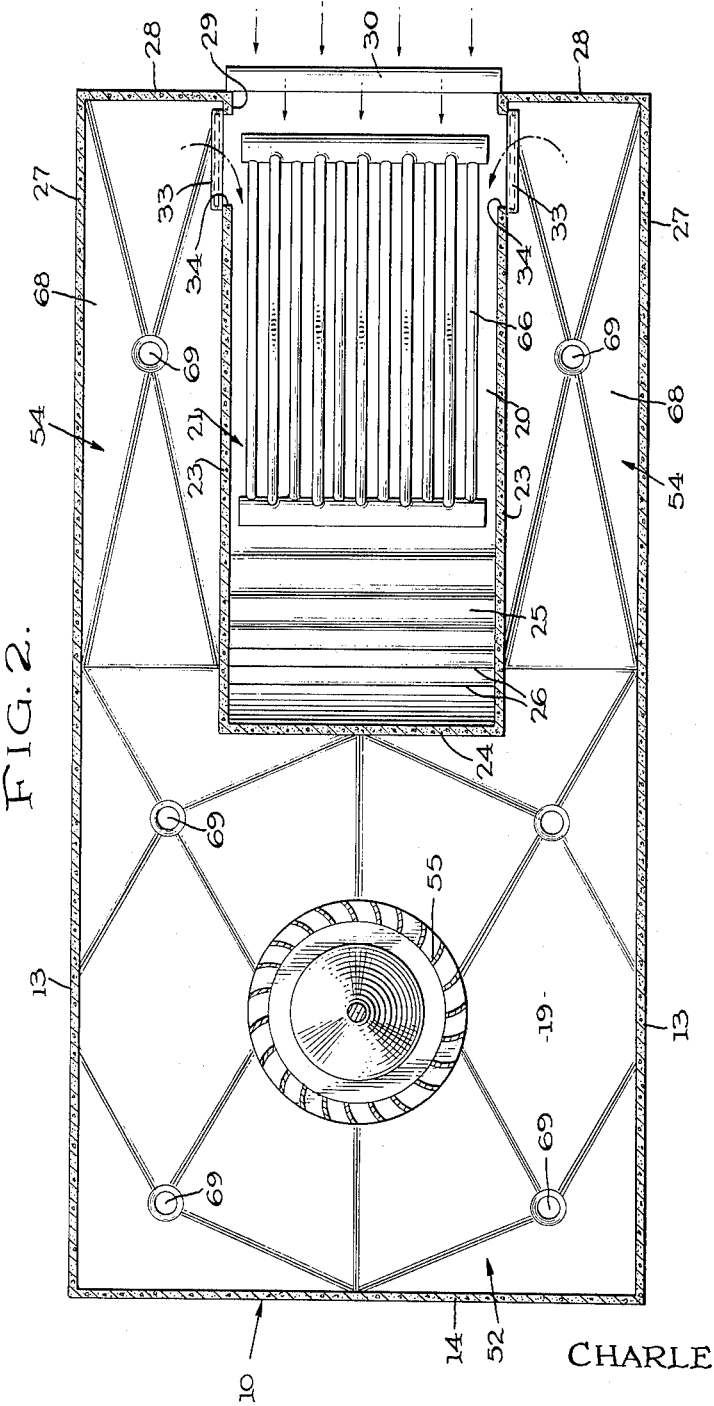
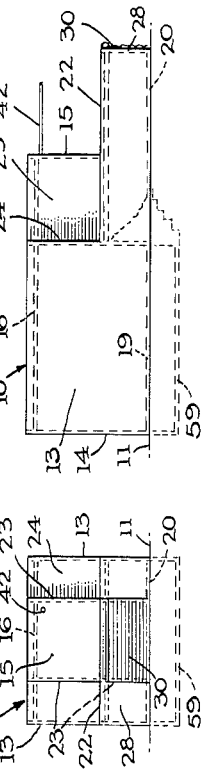
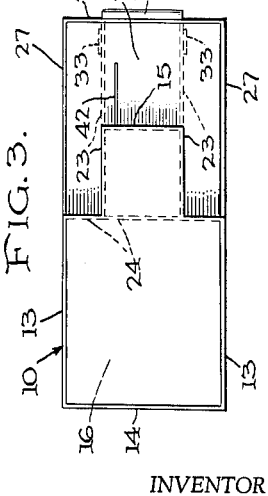
INVENTOR
CHARLES R. CUMMINGS
BY B. P. Fishburne, Jr.
ATTORNEY United States Patent Office 3,248,306
Patented Apr. 26, 1966

3,248,306
WATER PURIFICATION CONVECTIVE
DISTILLATION APPARATUS
Charles R. Cummings, 1311 Burmont Road,
Drexel Hill, Pa.
Filed Aug. 28, 1962, Ser. No. 219,963
3 Claims. (Cl. 202—185)

This invention relates to a method of and apparatus for extracting fresh water, free of impurities, from salt water or other contaminated water.

The principal object of the invention is to provide a method and an apparatus of the above-mentioned character which may be economically operated to produce fresh palatable water on a large scale from sea water, swamp water or water contaminated with industrial wastes, the invention in its operation closely simulating the processes of nature for producing fresh rain water.

Another important object of the invention is to provide a practical apparatus of the above-mentioned character capable of having an extermely long life during the operational use thereof with low operation and maintenance costs.

Another object of the invention is to provide a method and apparatus of the mentioned character which may be regulated or adjusted to operate satisfactorily in any geographical location or in any climate.

Still another object is to provide a fresh water extracting system which may be powered by readily available fuels including coal or oil or by atomic power.

Another object is to provide a system of the type and for the purpose mentioned where extremely high or low temperatures or high or low pressures are not required for the satisfactory operation of the system.

Another object is to provide a system which once started into operation needs never to be shut down for cleaning, scraping or waste disposal.

Another important object of the invention is to provide a water extracting system for producing fresh water, wherein atmospheric air is used as a vehicle, as in the natural rain-making process, and without excessive corrosion or deterioration of equipment.

Still another object of the invention is to provide a system where concentrated solutions of minerals and/or chemicals in waste, such as sea water, can be further economically refined for recovery outside of the fresh water producing operation proper.

Another and general object is to provide a fresh water producing method and apparatus capable of duplicating or closely simulating the air currents of nature, with the usual high and low pressure weather effecting regions and the warm and cool regions, without any actual extremes of pressure or temperature, such as frequently created artificially in man-made instrumentalities, of various sorts.

Other objects and advantages of the invention will be apparent to those skilled in the art during the course of the following detailed description.

In the accompanying drawings, forming a part of this application, and in which like numerals are employed to designate like parts throughout the same, FIGURE 1 is a partly diagrammatic central vertical longitudinal section through an apparatus employed in the practice of the method according to the invention, FIGURE 2 is a horizontal section taken substantially on line 2—2 of FIGURE 1, FIGURE 3 is a partly diagrammatic top plan view of the apparatus on a greatly reduced scale, FIGURE 4 is a front end elevation of the same, and FIGURE 5 is a side elevation thereof.

In the drawings, wherein for the purpose of illustration is shown one illustrative embodiment of the invention, the numeral 10 designates generally an enclosure or building structure of a permanent nature formed substantially entirely from high stress, air tight, insulated concrete or like material, and capable of being formed in substantially any desired size to meet the needs of a particular installation. The overall size of the apparatus while variable is adapted to be constructed on a large scale for producing constantly large quantities of fresh water, the size being limited only by the practical limits of certain apparatus components, such as refrigeration equipment, fans, turbines and the like.

Under normal atmospheric temperatures and pressures, this system will produce about fifteen thousand gallons of pure, fresh water per day, for each single effect capable of handling fifty thousand cubic feet per minute of atmospheric air. Multiple effect units can be built by adding additional humid air sections around the large low pressure area, to be described, and speeding up the large blower, to be described, or adding additional blowers.

The enclosure 10 is arranged substantially above the ground level which is indicated at 11, and near a source of contaminated or salt water, such as a river, swamp or sea. A relatively small portion or well 12 of the enclosure 10 may be arranged somewhat below ground level as indicated in FIGURE 1.

The enclosure or building structure 10 may be rectangular in plan, FIGURE 2, with the superstructure thereof composed of side walls 13, an end wall 14, another partial end wall 15, FIGURE 1, and a top wall or roof 16, all integrally connected. Above the top wall 16, and above the roof of the entire structure, a shallow open top water reservoir 17 is formed by a marginal upstanding flange 18. The water in reservoir 17 is for heat insulating purposes only, and forms no part of the fresh water extracting system proper. The enclosure 10 has an interrupted bottom wall, one portion of which is indicated at 19, and another portion of which is shown at 20, substantially at ground level.

Formed integral with the main enclosure 10 is a sub-enclosure or entrance chamber 21 for atmospheric air, and being rectangular in plan, FIGURE 2, and materially narrower than the main enclosure 10 and shorter than the main enclosure and extending somewhat beyond the partial end wall of the main enclosure. The chamber 21, FIGURE 1, has a horizontal top wall 22 at right angles to the partial end wall 15 and joined thereto and vertical side walls 23 and a rear vertical end wall 24, as shown. At its lower end, the wall 24 is enlarged to provide an approximately circularly curved drain surface 25, preferably ridged at 26 to retard and break up water flowing downwardly thereover. The drain surface 25 leads to the level bottom wall portion 20 which is common to the main enclosure 10 and chamber 21.

As shown in the drawings, particularly FIGURE 2, the sub-enclosure or chamber 21 is centered laterally between the main enclosure side walls 13 and spaced equidistantly from the latter. These side walls 13 between the walls 20 and 22 are extended beyond the end wall 15 as shown at 27 in FIGURE 2, and then connected with relatively narrow end wall portions 28 at right angles thereto, directed inwardly and joined to the side walls 23 at the forward ends of the latter. The horizontal wall 22 therefore not only spans the top of chamber 21 as depicted in FIGURE 2, but also spans the relatively narrow side portions of the main enclosure 10 below the partial end wall 15 and on opposite sides of the chamber 21.

At the forward end thereof, the chamber 21 has a main atmospheric air inlet opening 29, covered by an adjustable preferably roll-type closure 30, weighted at its lower end at 31 for air sealing coaction with a ground embedded flange 32, slightly above the level of bottom wall portion 20. The chamber side walls 23 also provided just inwardly of the main inlet opening 29 with similar adjustable closures 33, adapted to cover or partially cover or to leave uncovered oppositely arranged side wall openings 34 for a purpose to be described.

Within the chamber 21, near and slightly above the top wall 22 thereof, there is provided a slightly inclined baffle 35, integrally joined to the partial end wall 15 and spanning the distance between the chamber side walls 23 and integrally joined therewith. A similar and reversely arranged baffle 36 extends from the top of wall 24 toward the wall 15 and also spans the distance between the chamber side walls 23 and is integrally connected therewith. The free edges of the baffles 35 and 36 are substantially in vertically spaced alignment, FIGURE 1. Spaced parallel horizontal splasher beams 37 span the upper portion of the chamber 21, substantially midway between the baffles 35 and 36 and directly under the baffle 36. These beams have their ends joined to the vertical side walls 23 and therefore span the width of the chamber 21. An air outlet passage 38 at the top of chamber 21 is defined by the upper portions of side walls 23, the partial end wall 15, and the upper baffle 36. This outlet passage 38 and the air chamber 39 immediately thereabove are of the same width as the chamber 21 and the opening 29 leading into the chamber 21. Therefore, the incoming atmospheric air passes through a relatively small or constricted passage or chamber as compared to the size or volume of the large sub-atmospheric chamber within the main enclosure 10, to be described. In fact, and in practice, the large sub-atmospheric chamber is about fifteen hundred times as large as the chamber 39, so that the volumetric expansion of the air as it enters the low pressure chamber from the chamber 39 is about fifteen hundred to one.

Within or adjacent to the outlet passage 38, suitable germicidal lamps 40 are mounted in any preferred manner, to kill bacteria in the incoming atmospheric air.

A heat exchanger coil 41 of horizontally zigzagged formation, also serving as the inlet conduit for contaminated or salt water, is disposed within the chamber 39 and between the top wall 16 and baffle 36. The coil 41 has a top horizontal extension 42 opening through the partial end wall 15 near and below the top wall 16 to receive the contaminated or salt water pumped thereto by any suitable means, not shown. The bottom of the coil 41 is connected at 43 with a contaminated water manifold 44 having depending outlet nozzles 45 opening downwardly through the baffle 36 and directly above the beams 37, whereby the incoming contaminated or salt water discharging from the nozzles 45 is broken up into droplets by impinging upon the beams 37. It will be understood that a multiplicity of the coils 41, inlet extensions 42, and manifolds 44 may be provided in the chamber 39 in side-by-side spaced relation, to substantially span the entire width of the chamber 39 between the side walls 23 thereof.

At the rear side of the heat exchanger coil 41, vertically above the wall 24, the outlet end of chamber 39 is equipped with an automatically adjustable bank of louvers 46, to regulate the flow of air entering a large low pressure chamber 47, having a large bank of evaporator or refrigeration coils 48 suitably mounted therein near the top thereof. The adjustable louvers 46 create a large flow nozzle for controlling the turbulence of air entering the chamber 47 from the chamber 39.

A multiplicity of fresh water spray nozzles 49 depend from the top wall 16 to spray cold fresh water into the top of the large chamber 47, to aid coalescence therein. The spray nozzles 49 are capable of spraying fresh water over substantially the upper area of chamber 47. The nozzles 49 are supplied with cold water from the fresh water accumulator or drain line 70, to be described, and after such water is chilled to about 33 degrees F. by the refrigeration system including coils 48.

Below the evaporator coils 48, a downwardly tapering bottom wall 50 for the large chamber 47 is provided, integrally joined with the side walls 13, end wall 14 and wall 24. The tapered wall 50 has a bottom relatively large circular outlet opening 51 forming a passage leading into a high pressure chamber 52, below the low pressure or vacuum chamber 47. A relatively large discharge passage 53 is formed through the end wall 14 leading from the high pressure chamber 52, as shown. The chamber 52 communicates at opposite sides thereof and between the walls 50 and 19 with the branch chambers or passages 54, FIGURE 2, leading back to the adjustable closures 33 and the side openings 34 communicating with the chamber 21. Quite obviously, if the adjustable closures 33 are completely covering the openings 34, all of the air from the chamber 52 must escape through the passage 53. On the other hand, if the closures 33 are opened or partly opened, some of the high pressure air from the chamber 52 will flow through the passages 54 and openings 34, back into chamber 21, as will be further described. In like manner, the adjustment of the closure 30, anywhere between the fully opened and fully closed position will control the amount of atmospheric air entering through the main inlet opening 29. Therefore, depending upon climatic conditions and the geographical location of the apparatus, all of the incoming air may be fresh atmospheric air, or the incoming air may be partly atmospheric air and partly air returned from the high pressure chamber 52, or a mixture of atmospheric air with air from the chamber 52.

Within the chamber 52, immediately below the opening 51, a high speed, high volume blower 55 of a known type is adapted to draw air and condensed fresh water from the low pressure chamber 47 through the opening 51 and axially into the blower, and this air and water is then propelled outwardly against all side walls of the chamber 52. The blower 55 is mounted for rotation upon a vertical shaft 56, journaled for rotation within a suitable bearing 57 on the bottom wall portion 19. The shaft 57 extends below the wall 19 and into and through the well 12 and has its lower end supported by a suitable thrust bearing 58, located in a sub-floor 59 arranged below the ground level and constituting the bottom wall of the well 12.

The blower shaft 56, within the well 12, has a gear 60 secured thereto, driven by a gear 61, on the shaft 62 of a steam turbine 63, also mounted within the well 12, and powered by a suitable boiler or the like, not shown, through an inlet steam line 64. The boiler which may be arranged remotely from the apparatus may be fired with bituminous coal, oil or any other suitable fuel. If preferred, the steam delivered to the turbine 63 may be formed in a boiler which derives its heat from a suitable atomic energy source forming no part of this invention.

A steam exhaust line 65 from turbine 63 delivers exhaust steam to suitable heating coils 66 located in the inlet portion of chamber 21, FIGURES 1 and 2. Other suitable sources of heat in the inlet portion of the chamber 21 may be employed if preferred, instead of the steam heated coils 66, or in conjunction therewith.

A drain line 67 or lines lead from the bottom wall 20 near the inlet mouth of chamber 21 to convey the residue contaminated or salt water with concentrated impurities back to the source of such water or to any suitable collection point.

The bottom wall portion 19 of chamber 52 and the contiguous bottom walls 68, FIGURE 2, of side chambers 54 are equipped with a plurality of fresh water drains 69, leading to suitable drain piping 70, FIGURE 1, for conveying all of the fresh water produced by the apparatus and method to a suitable collection or storage location.

As an optional feature, the blower shaft 56 may extend above blower 55 as indicated at 71 and carry an impeller device 72 at its top end for creating turbulence within the low pressure chamber 47.

The operation of the apparatus in the practice of the method is as follows.

Contaminated or salt water is continuously pumped into the inlet section 42 of heat exchanger 41 and therefore continuously discharged downwardly through the nozzles 45 onto the beams 37. The beams 37 break up the water into droplets, and a continuous rain or falls of contaminated water passes onto the ribbed surface 25 and flows downwardly toward the drain 67 reversely to the path of travel of the incoming atmospheric air.

Simultaneously, the blower 55 is continuously operated at high speed by the turbine 63 for creating sub-atmospheric pressure in the chamber 47, preferably equal to natural atmospheric pressure at an altitude of from 10,000–15,000 feet above sea level. Therefore, the pressure in the chamber 47 will always be in the approximate range of about 10.1–8.3 pounds per square inch. This sub-atmospheric pressure constantly maintained in the chamber 47 is a critical features of the invention, utilized in the method to gain air expansion in the large chamber 47 necessary for adiabatic cooling.

Simultaneously, the relatively high pressure air discharged by the blower 55 into chamber 52 passes from the apparatus through the outlet passage 53. If the closures 33 are fully opened or partly opened, some of the air forced into chamber 52 by the blower will pass through side chambers 54 and through the openings 34 and into the inlet chamber 21. If the closure 30 is open or partly open, atmospheric air will enter the chamber 21 through the opening 29 thereof to mix with the air delivered from the chamber 52.

In climatic regions where the temperature is above 35–40 degrees Fahrenheit, atmospheric air alone through the opening 29 is utilized, and the closures 33 are fully closed and the closure 30 is fully opened. In regions where the temperature is below 35 degrees or 40 degrees Fahrenheit, the outside closure 30 is fully closed or adjusted partly closed and the inside closures 33 are opened, thus permitting air from the high pressure chamber 52 to enter the chamber 21. Such air simply recirculates again through the system as this air from the chamber 52 is warmer than the outside atmospheric air in cold climates. Normally, the air from the chamber 52 will escape to atmosphere through the passage 53, as stated, after it has released most of its vapor content in the form of fresh water.

Simultaneously with all of the above, exhaust steam from the turbine 63 is conveyed through the line 65 to heating coils 66 in the inlet portion of chamber 21, just inwardly of closures 30 and 33. The coil 66 will heat the incoming air to about 130 degrees F. or to the highest possible degree possible by the use of the exhaust steam. All of the processes described thus far in the operational cycle of the method are continuous and the entire method is in fact continuous once started.

In like manner, the lamps 40 are energized to continuously destroy bacteria in the air rising within the chamber 21 and through the passage 38. The evaporator or refrigeration coils 48 are placed into operation in a conventional manner by a suitable mechanical refrigeration system which may be arranged in part exteriorly of the apparatus, and downwardly directed sprays of cold fresh water from the pipe 70 and nozzles 49 continuously enter the top of the chamber 47 to aid coalescence of fresh water vapor therein, in conjunction with the evaporator coils 48.

With the entire system operating as described above, the actual conversion of the contaminated or salt water into fresh, pure and palatable water simulating natural soft rain water occurs as follows. The incoming atmospheric air or a mixture of such air with recirculated air from the chamber 52 enters the mouth of the chamber 21 and is heated by the coils 66 to the extent possible, such as 130 degrees Fahrenheit, as previously stated. This hot air then rises within the chamber 21 after passing the baffle 35 and becomes fully saturated with moisture taken from the contaminated water falls through which it must pass as indicated by the arrows in FIGURE 1. The chamber 21 beyond and above the heating coils 66 is therefore a high humidity chamber in the system. The hot saturated air then passes upwardly above the beams 37 and baffle 35 and through the passage 38 containing the lamps 40 which kill airborne bacteria. The hot saturated air then passes over the heat exchanger 41 which begins to chill the saturated air and also warms the incoming contaminated or salt water before the latter falls and splashes on the concrete beams 37. The slightly chilled air then passes from the relatively small upper chamber 39 through the adjustable louvers 46 which control the turbulence thereof in a desired manner. That is to say, the louvers 46 constitute a large area nozzle for directing the somewhat chilled and still saturated air into the large sub-atmospheric chamber 47 at the upper region thereof adjacent to the refrigeration coils 48.

Upon passing into the chamber 47, the moisture-laden air expands greatly due to the partial vacuum in the chamber 47 and the great difference in volume between the chambers 47 and 49. This expansion coupled with the effect of refrigeration within the chamber 47 and with the effect of the cold water sprays therein causes the temperature of the moisture laden air to be lowered to about minus five to plus four degrees C., where condensation of fresh water takes place. Coalescence is aided by the cold water sprays as stated. As coalescence begins, fresh water falls as rain within the chamber 47 and into the very large blower 55, which slings water droplets outwardly against the side walls of chamber 52. The fresh water finally collects on the floor or bottom wall 19, and is drained off by the pipe 70 as previously described.

As should now be apparent, the method herein closely simulates the process of nature in producing fresh rain water. The system includes in the chamber 47 a low pressure region and in the chamber 52 a high pressure region. The chamber 21 constitutes a high humidity atmospheric chamber at a pressure approximating atmospheric pressure at sea level or somewhat thereabove, as influenced by air from the high pressure chamber 52. In any event, the air pressure in the chamber 21 will be well above the sub-atmospheric pressure in the chamber 47. The heated humid air chamber 21 is much smaller in volume than the low pressure chamber 47, for the purpose of creating a natural rain-making atmosphere as found in nature.

Special note should be taken of the fact that the air is drawn by the blower 55 or sucked into the apparatus and not blown into it, as the latter would have an adverse effect upon the low pressure chamber 47. A correct relationship must be maintained at all times between the temperature of the incoming air in chamber 21 and the sub-atmospheric pressure in the chamber 47. This relationship can be adjusted by increasing or decreasing the speed of blower 55 and also by adjusting the louvers 46 adjacent the heat exchange 41. This latter adjustment can readily be rendered automatic.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. An apparatus for extracting fresh water from impure water in a continuous manner on a mass scale comprising a large substantially closed coalescence chamber having a bottom outlet opening, a vertical axis of rotation blower at said outlet opening to draw coalesced fresh water droplets and air from the coalescence chamber and to maintain subatmospheric pressure therein, means forming a high pressure chamber around said blower and beneath the coalescence chamber, said blower driving coalesced fresh water droplets radially outwardly horizontally in the high pressure chamber, said high pressure chamber including a floor having fresh water drain means, turbine means beneath said floor for driving said blower, branch horizontal drain passage leading from opposite sides of the high pressure chamber and coalescence chamber, a relatively small atmospheric air heating and moisture saturating chamber between said passages and near one side of the coalescence and high pressure chambers and substantially separated from the latter, said atmospheric chamber communicating with said passages near the bottom of the atmospheric chamber, said atmospheric chamber also communicating with the outside atmosphere, an air heating element within said atmospheric chamber to elevate the temperature of air entering the same, variable louver means between the top portion of the atmospheric chamber and said coalescence chamber, a heat exchange coil in the top portion of the atmospheric chamber adapted to convey impure water into the atmospheric chamber and to chill moisture-laden warm air rising therein, depending nozzle means on the heat exchange coil for directing impure water downwardly therefrom in the atmospheric chamber opposite to the flow of warm air therein, and means in the atmospheric chamber near the nozzle means to disperse the impure water into droplet form in the atmospheric chamber.

2. Apparatus for extracting fresh water from impure water by substantially duplicating the weather processes of nature comprising substantially unitary enclosure structure having a large coalescence chamber at the top and upon one side thereof, a high pressure chamber below the coalescence chamber, a relatively small atmospheric air chamber on one side of the coalescence chamber and high pressure chamber and branch drain passages interconnecting the high pressure chamber and atmospheric air chamber and extending on opposite sides of the latter, the coalescence chamber having a bottom opening communicating with the high pressure chamber, a large vertical axis blower in the high pressure chamber adjacent said opening, restricted louver opening means between the top of the atmospheric air chamber and coalescence chamber, chilling means in the coalescence chamber to assist coalescence therein near the top thereof, atmospheric air heating means in the bottom portion of said atmospheric air chamber, and conduit means in the upper portion of the atmospheric air chamber to convey impure water thereto and direct such water in the form of a spray downwardly therein opposite to the flow of heated air in the atmospheric air chamber.

3. The invention as defined by claim 2, and wherein the conduit means includes a heat exchange coil within the upper portion of the atmospheric air chamber near said louver opening means and having depending nozzle extensions, and fixed splash abutments within the atmospheric air chamber beneath said nozzle extensions.

References Cited by the Examiner

UNITED STATES PATENTS

| | | | |
|---|---|---|---|
| 192,635 | 7/1877 | Clark | 202—205 X |
| 614,776 | 11/1898 | Stocker. | |
| 783,942 | 2/1905 | Forbes | 202—185.2 X |
| 1,379,502 | 5/1921 | De Woern. | |
| 1,493,756 | 5/1924 | Le Bour | 202—49 X |
| 2,142,747 | 1/1939 | Fisher. | |
| 2,342,062 | 2/1944 | Schenk | 202—205 |
| 2,368,665 | 2/1945 | Kohman et al. | 202—49 |
| 2,537,259 | 1/1951 | Cleaver et al. | 202—75 X |
| 2,803,591 | 8/1957 | Coanda et al. | 202—234 |
| 3,104,211 | 9/1963 | Protat | 202—234 |

OTHER REFERENCES

German application K249301/a/17a, December 13, 1956.

NORMAN YUDKOFF, *Primary Examiner.*